United States Patent [19]

Leitl et al.

[11] Patent Number: 4,611,211
[45] Date of Patent: Sep. 9, 1986

[54] RADAR DEVICE

[76] Inventors: Franz Leitl, Alleenstrasse 21, D-7015 Korntal-Münchingen; Georg Schulte-Hubbert, Schützenplatz 4, D-7141 Möglingen, both of Fed. Rep. of Germany

[21] Appl. No.: 362,985

[22] Filed: Mar. 29, 1982

[30] Foreign Application Priority Data

Apr. 7, 1981 [DE] Fed. Rep. of Germany ....... 3113904

[51] Int. Cl.⁴ .............................................. G01S 13/58
[52] U.S. Cl. ................................. 343/9 R; 343/11 VB
[58] Field of Search .................. 343/9 R, 14, 8, 12 R, 343/7.7, 11 VB

[56] References Cited
U.S. PATENT DOCUMENTS 4,038,658 7/1977 Nelson et al. .................... 343/7.7

Primary Examiner—T. H. Tubbesing
Assistant Examiner—John B. Sotomayor
Attorney, Agent, or Firm—Collard, Roe & Galgano

[57] ABSTRACT

The novel radar device (1) radiates triangularly frequency-modulated continuous-wave signals via two radiation patterns (3, 4). If an object (2) is detected by one radiation pattern at a time, relative velocity ($V_1$, $V_2$) and distance ($r_1$, $r_2$) are measured. The time between the measurements with signals received via the first and the second radiation pattern, respectively, is t. If the velocity of the object (2) relative to the radar device is $V_1 = 0$ when it is detected by the first radiation pattern, the associated distance is $r_{10}$. The velocity of the object is determined either by the equation $$V_B = \frac{V_2}{\sqrt{1 - \left(\frac{r_{10}}{r_2}\right)^2}}$$

or by either of the equations $$V_A = \frac{1}{t}\sqrt{r_2^2 - r_{10}^2} \text{ and } V_A = \frac{V_2}{\sqrt{1 - \left(\frac{r_{10}}{r_2}\right)^2}}.$$

A combination of $V_A$ and $V_B$ is also possible.

If the object is so large in extent as to be detected by both radiation patterns simultaneously, switchover between the two radiation patterns is effected at a given clock rate.

If no pairs of values are used at which $V_1 = 0$, the evaluation is performed in accordance with either of the equations $$V_A = \sqrt{\frac{V_2 r_2 - V_1 r_1}{t}} \text{ and } V_B = \sqrt{\frac{(V_2 r_2)^2 - (V_1 r_1)^2}{r_2^2 - r_1^2}}.$$

12 Claims, 3 Drawing Figures

RADAR DEVICE

The present invention relates to a FM-CW radar device as it is generally known from the book "Introduction to Radar Systems" by M. I. Skolnik, McGraw Hill Book Company, New York, 1980, pages 68–86. A transmitter transmits a carrier frequency $f_0$ which is modulated by + or $-\Delta f/2$ (page 82) provided by an oscillator. A second oscillator provides a reference frequency $f_{IF}$ (page 85). The frequency of the signal reflected by an object is shifted depending on the range and the velocity of the object. The difference or beat frequency $f_b$ between the transmitted central frequency $f_0$ and the received central frequency $f$ gives information on the range and the velocity of the object. The frequency shift resulting from the velocity of the object is a doppler frequency shift $f_d$ being negative for a receding object and being positive for a closing object (pages 70 and 83). The frequency shift $f_r$ resulting from the range of the object is independent of the velocity. In the known FM-CW radar the range is measured from the range frequency shift $f_r$, and the velocity is measured from the doppler frequency shift $f_d$ which shifted frequencies are calculated from the measured beat frequency in a processing means which also receives the reference frequency $f_{IF}$. The thus working FM-CW radar method is known since the 1930's (Skolnik page 84).

A radar device which makes use of two transmitters and receivers is known from "Elektronik-Zeitung" No. 3, Feb. 9, 1981, page 6. The first transmitter $Tr_1$ receives a frequency $f_{01}+$ or $-\Delta f/2$ from a first oscillator whereas the second transmitter $Tr_2$ receives a second frequency $f_{02}+$ or $-\Delta f/2$. The first transmitted frequency is used as a reference frequency for the second channel, whereas the second frequency is used as a reference frequency for the first channel. The first receiver $R_1$ receives a third modulated frequency $f_3+$ or $-\Delta f/2$, whereas the second receiver $R_2$ receives a fourth modulated frequency $f_4+$ or $-\Delta f/2$. The frequencies are processed in a first processing means and a second processing means, respectively, in the usual manner. The first channel measures the velocity $V_1$ and the distance $r_1$ of an object when it moves through a first radiation pattern of a first antenna comprising the first transmitter and the first receiver. The second channel calculates the velocity $V_2$ and the distance $r_2$ of the object when it passes through a second pattern of a second antenna comprising the second transmitter and the second receiver. The directions of maximum radiation of the two radiation patterns must include an angle of 90°. In some applications this requirement is disadvantageous.

Therefore, a novel radar device is provided in which the angle between the directions of maximum radiation of the two radiation patterns may lie within a wide range. The evaluation can be performed rapidly and with a small amount of circuitry.

The novel radar device is especially suitable for measuring the velocity of rolling stock, the velocity of a moving fluid, or the proper speeds of vehicles.

Embodiments of the invention will now be explained in more detail with reference to the accompanying drawing. In the drawing.

Figure 1:
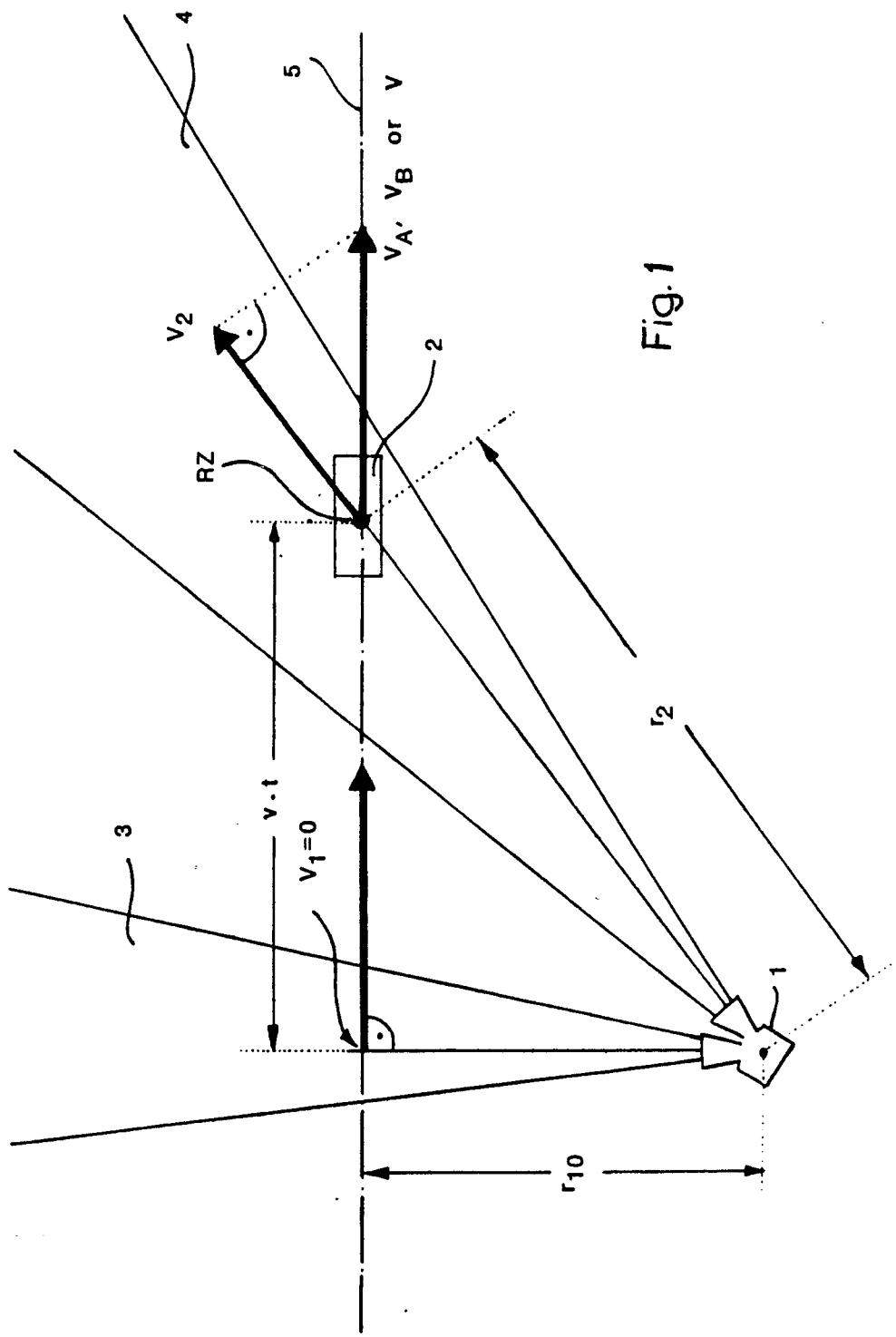
FIG. 1 shows a schematic operating diagram of the radar device embodying the present invention.

The drawing is a schematic operating diagram of the radar device embodying the present invention.

A radar device 1 radiates triangularly frequency-modulated continuous-wave signals via two radiation patterns 3, 4 in different directions. The directions of maximum radiation of the two radiation patterns include an angle of 45°. During the measurement, the direction of maximum radiation of one of the radiation patterns is set so as to make an angle of approximately 90° with the direction of motion 5 of the object 2, whose distance and relative velocity are to be measured. If the direction of motion of the object is fixed (e.g., rolling stock, moving fluids), the focusing can be chosen to be relatively sharp. If the direction of motion varies within certain limits, less sharp focusing will be chosen. In this case, the 90° requirement can be satisfied in a larger angular range.

A radar device contains an RF portion, an IF portion, an AF portion, and an evaluating portion. The novel radar device contains an RF portion, an IF portion, and an AF portion for each direction. There is only one evaluating portion for both directions. In certain applications it suffices to switch between the two directions in a given rhythm. In these cases, only one IF portion and only one AF portion are necessary.

The individual parts will not be dealt with here because they are generally known to those skilled in the art (e.g., from the book "Introduction to Radar Systems" by M. I. Skolnik, McGraw Hill Book Company, New York, 1980).

As mentioned above, the direction of maximum radiation of the first radiation pattern 3 makes an angle of approximately 90° with the direction of motion 5 of the object 2. At an angle of exactly 90°, the relative velocity $V_1$ with respect to the radar device is zero. In the other cases, zero relative velocity is measured for signals from directions which slightly deviate from the direction of maximum radiation. From the pairs of measured values for relative velocity and distance, that pair is selected at which the relative velocity is zero, and the distance assigned to it, $r_{10}$, is stored. In addition, the instant at which this pair of values is measured, $T_1$, is determined and stored.

When the object is detected by the second radiation pattern, relative velocity, $V_2$, and distance, $r_2$, are measured again. A pair of values and the instant at which this pair of values was measured, $T_2$, are stored.

From the measured values, the velocity of the object in its direction of motion is determined in a computer of the radar device by the equation $$V_A = \frac{V_2}{\sqrt{1 - \left(\frac{r_{10}}{r_2}\right)^2}}.$$

Since the instants at which the pair of values were measured are stored, it is possible to determine the time difference $t$ between the measurements. Between the measurements, the object travelled the distance $v.t$ in its direction of motion 5. Thus, the velocity can also be determined by the equation $$V_B = \frac{1}{t} \sqrt{r_2^2 - r_{10}^2}$$

or by the equation $$V_B = \frac{V_2}{\sqrt{1 - \left(\frac{r_{10}}{r_2}\right)^2}}.$$

In the foregoing description it was assumed that the first radiation pattern is oriented approximately perpendicular to the direction of motion (5) of the object, and that in this direction a pair of values for the distance $r_1$ and the relative velocity $V_1$ is present at which the relative velocity $V_1$ is zero. In certain applications, however, this condition cannot always be fulfilled. However, velocity measurement is possible in these cases, too. It is performed as described in the following embodiment. FIG. 1 applies analogously except that the direction of maximum radiation of the first radiation pattern does not make a right angle with the direction of motion 5 of the object. The radiation patterns point in arbitrary directions relative to the direction of motion. From each of the pairs of values $r_1$, $v_1$ and $r_2$, $v_2$, which are measured for the two directions, one pair is selected at random. The velocity of the object is then determined by the equation $$V_A = \sqrt{\frac{V_2 r_2 - V_1 r_1}{t}}$$

or by the equation $$V_B = \sqrt{\frac{(V_2 r_2)^2 - (V_1 r_1)^2}{r_2^2 - r_1^2}}$$

or by equations derived from these equations.

As in the first case, the time t is time between the two instants at which the two pairs of values were measured. The time t will be determined only if the equation containing t is used for the evaluation.

If the object is a single moving object of relatively small spatial extent, it will be detected first by the first radiation pattern 3 and then by the second radiation pattern 4. This applies to each of the above examples. In these cases, the time t and, hence, a velocity $V_A$ and a velocity $V_B$ can be determined. This overdetermination can be utilized in an advantageous manner to compensate for any motion of the doppler centroid RZ of the object's reflecting area relative to the geometry of the object.

So far it has been assumed that between the measurements the position of the doppler centroid RZ relative to the geometry of the object 2 does not change in the direction of the two radiation patterns 3, 4. In these cases, the velocity $V_A$ is equal to the velocity $V_B$. If the relative velocity of the doppler centroid changes, different values $V_A$, $V_B$ may be obtained for the velocity of the object in its direction of motion, depending on which measured values are taken as a basis for the evaluation, i.e., the measurement result is overdetermined.

This is utilized in an advantageous manner to improve measurement accuracy. To accomplish this, the two results are suitably combined, namely according to the equation $$V = \alpha V_A + \beta V_B.$$

where $\alpha$ and $\beta$ are weighting factors ($\alpha + \beta = 1$) depending on the ratio $r_1/r_2$ of the distances and on the shape of the object.

For typical object shapes, unambiguous rules can be defined for the weighting factors $\alpha$ and $\beta$; they make it possible to exactly compensate for the influence of the position of the doppler centroid of the reflecting area relative to the geometry of the object.

For example, for spherical or cylindrical objects with $V_1 = 0$ and $\rho/r_1 = 0.5$, where $\rho$ is the diameter of the sphere, the following coefficients are obtained:

$$\alpha = \frac{2\frac{r_1}{r_2}}{1 + 3\frac{r_1}{r_2}}$$

$$\beta = \frac{1 + \frac{r_1}{r_2}}{1 + 3\frac{r_1}{r_2}}.$$

If the velocity V is calculated from the combination of $V_A$ and $V_B$, it is possible for the computer of the radar device to compute the velocity V directly instead of calculating the velocities $V_A$ and $V_B$ separately. For the above example, $$V = \frac{1}{r_2 + 3r_1} \left[ 2r_1 \sqrt{\frac{V_2 r_2}{t}} + V_2 \sqrt{\frac{r_2 + r_1}{r_2 - r_1}} \right].$$

If the object is a plane surface oriented parallel to the direction of motion, then $\alpha = 0$ and $\beta = 1$. If the plane surface is oriented perpendicular to the direction of motion, then $\alpha = 1$ and $\beta = 0$.

For other object shapes and other angles between the directions of maximum radiation, corresponding values can be determined for $\alpha$ and $\beta$.

So far it has been assumed that the object is detected by only one of the two radiation patterns at a time. In cases where the object is detected by both radiation patterns simultaneously, the evaluation can be analogous to the above. Examples of objects of very large extent are rolling stock, moving fluids, etc. It is also possible to measure the proper speed of a vehicle with the novel radar device. In this case, the radar device is disposed in the vehicle, and the object of very large extent is the road.

In the aforementioned cases, the object will always be detected by both radiation patterns at the same time, but only the signals received via a single radiation pattern will be further processed. Changeover from one radiation pattern to the other is effected proportionally to velocity, such that signals reflected from the same point of the object will be evaluated. This eliminates the influence of inhomogeneities of the surface of the object. Particularly advantageously, the switching frequency is chosen to be not only proportional to the velocity but also inversely proportional to the distance ($r_{10}$); in this manner, precisely the area being illuminated by the antennas will always be the same. In the case of media with homogeneous surfaces (e.g., moving water), it is also possible to switch between the two radiation patterns at a constant, velocity-independent rate.

Random variations of the doppler centroid of the reflecting area average to zero and have no influence on the accuracy of the measurement result.

In cases where the object is detected by both radiation patterns simultaneously, the time t is of no significance for the evaluation, because it is determined by the switching rate. Therefore, compensation for the relative motion is not possible.

Figure 2:
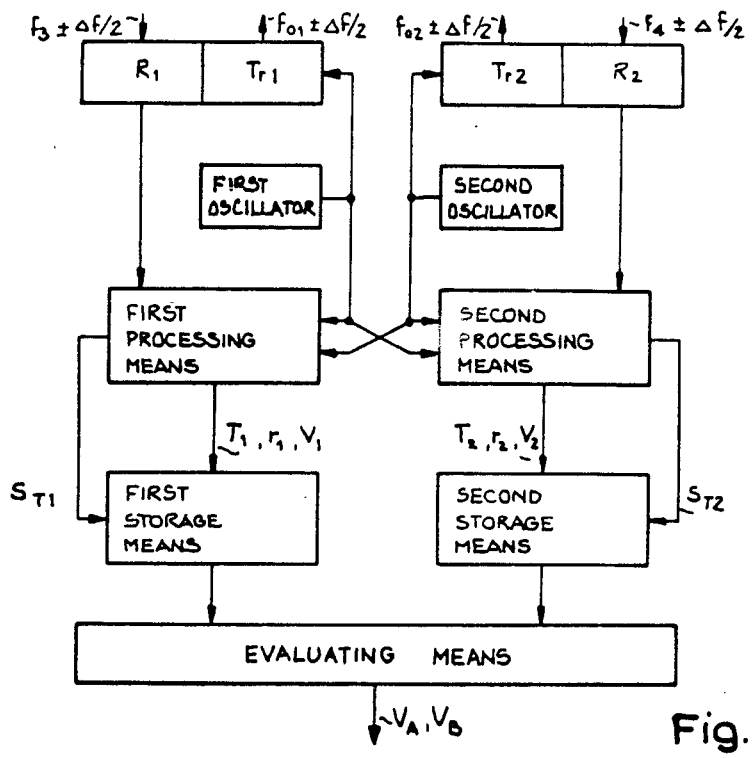
FIG. 2 shows a block diagram of a first embodiment of the radar device, measuring the velocity of a single object.

The radar device according to the embodiment of FIG. 2 comprises a first channel and a second channel, as in the radar device known from the "Elektronik-Zeitung" reference discussed above. The first channel comprises a first transmitter $Tr_1$, a first receiver $R_1$, a first oscillator and a first processing means. The first processing means calculates in a known manner (see beginning of specification) the values of $r_1$ and $V_1$, and it detects the time $T_1$ at which an object passes through the first radiation pattern. The second channel comprises corresponding means to calculate the values of $r_2$ and $V_2$ and to measure the time $T_2$ at which the object passes through the second radiation pattern. The first calculated values are stored in a first storage means triggered by a trigger signal $S_{T1}$ which is developed by the first processing means, when the processing means receives measured values of the detected object and calculates the range and the velocity of the object from the measured values. Correspondingly a second storage means stores the second calculated values triggered by a trigger signal $S_{T2}$. All stored values are introduced into an evaluating means which calculates the velocity in movement direction of the object by the above mentioned equations.

Figure 3:
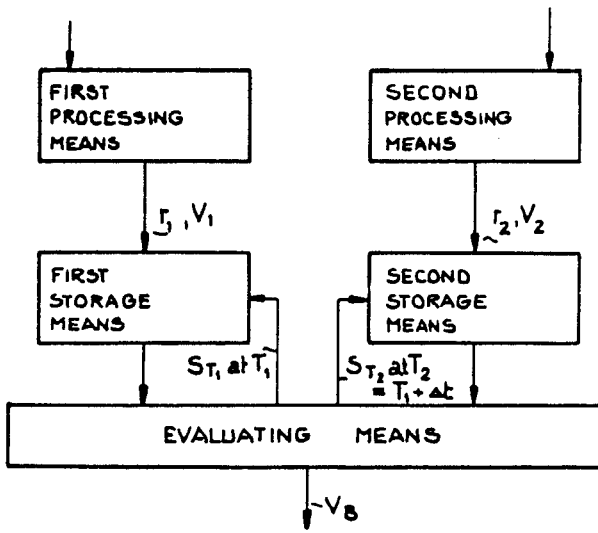
FIG. 3 shows a block diagram of a second embodiment of the radar device, measuring the velocity of an extended object.

Whereas the embodiment of FIG. 2 is used for measuring the velocity of a single object, the embodiment of a radar device according to FIG. 3 is used to measure the velocity of an extended object. As described above, in that case it is switched with a predetermined clock time from one channel to the other. The values calculated by the first processing means are stored by a trigger signal $S_{T1}$ at an arbitrary time T1. The values calculated by the second processing means are stored by the second storage means triggered by a second trigger signal $S_{T2}$ one clock-period later i.e. at the time $T2 = T1 + \Delta t$.

What is claimed is:

1. A method for determining the velocity of an object by an FM-CW radar device, said method comprising the steps of:
   (a) transmitting first modulated signals of a central frequency $f_{01}$ in a first direction of a first radiation pattern, and transmitting second modulated signals of a central frequency $f_{02}$ in a second direction of a second radiation pattern,;
   (b) receiving third modulated signals of a central frequency $f_3$ reflected in the first direction by an object of radial velocity $V_1$ having the distance $r_1$ from the receiver and receiving forth modulated signals of a central frequency $f_4$ reflected in the second direction by an object of radial velocity $V_2$ having the distance $r_2$ from the receiver, said first and second radiation patterns including an angle less than 90°;
   (c) calculating $r_1$, $V_1$, $r_2$ and $V_2$ from a first beat frequency $f_{b1} = f_{01} - f_3$ and a second beat frequency $f_{b2} = f_{02} - f_4$;
   (d) storing the values of $r_1$, $V_2$, $r_2$, and $V_2$; and
   (e) calculating the velocity in movement direction of the object by the equation $$V_B = \sqrt{\frac{(V_2 r_2)^2 - (V_1 r_1)^2}{r_2^2 - r_1^2}}.$$

2. The method of claim 1, wherein $r_1$ is calculated as to be $r_{10}$ for $V_1 = 0$, and the velocity in movement direction of the object is calculated by the equation $$V_B = \frac{V_2}{\sqrt{1 - \left(\frac{r_{10}}{r_2}\right)^2}}.$$

3. A method for determining the velocity of an object by an FM-CW radar device, said method comprising the steps of:
   (a) transmitting first modulated signals of a central frequency $f_{01}$ in a first direction of a first radiation pattern, and transmitting second modulated signals of a central frequency $f_{02}$ in a second direction of a second radiation pattern;
   (b) receiving third modulated signals of a central frequency $f_3$ reflected in the first direction by an object of radial velocity $V_1$ having the distance $r_1$ from the receiver and receiving forth modulated signals of a central frequency $f_4$ reflected in the second direction by an object of radial velocity $V_2$ having the distance $r_2$ from the receiver, said first and second radiation patterns including an angle less than 90°;
   (c) calculating $r_1$, $V_1$, $r_2$, and $V_2$ from a first beat frequency $f_{b2}f_{01} - f_3$ and a second beat frequency $f_{b2} = f_{02} - f_4$, and calculating a time difference $t = T_2 - T_1$;
   (d) storing the values of $r_1$, $V_1$, $r_2$, $V_2$ and t; and
   (e) calculating the velocity in movement direction of the object by the equation $$V_A = \sqrt{\frac{V_2 r_2 - V_1 r_1}{t}}.$$

4. The method of claim 3, wherein $r_1$ is calculated as to be $r_{10}$ for $V_1 = 0$, and wherein the velocity in movement direction of the object is calculated by the equation $$V_A = \frac{1}{t} \sqrt{r_2^2 - r_{10}^2}$$

5. The method of claim 3 further comprising the steps of:
   calculating the velocity in movement direction of the object by the equation $$V_B = \sqrt{\frac{(V_2 r_2)^2 - (V_1 r_1)^2}{r_2^2 - r_1^2}},$$

and calculating the velocity in movement direction of the object by $$V = \alpha V_A + \beta V_B$$

$$\alpha + \beta = 1$$

with $\alpha$ and $\beta$ being weighing factors which are both a function of the ratio $r_1/r_2$ and a function of the shape of the object.

6. The method of claim 4 further comprising the steps of:

calculating the velocity in movement direction of the object by the equation $$V_B = \frac{V_2}{\sqrt{1 - \left(\frac{r_{10}}{r_2}\right)^2}}, \text{ and;}$$

finally calculating the velocity in movement direction of the object by $$V = \alpha V_A + \beta V_B$$

$$\alpha + \beta = 1,$$

with $\alpha$ and $\beta$ being weighing factors which are both a function of the ratio $r_1/r_2$ and a function of the shape of the object.

7. The method of claim 1, wherein only signals are evaluated in step e which were reflected from an object in a given distance interval.

8. The method of claim 1, wherein the received third modulated signals and the received fourth modulated signals are sampled alternately at a predetermined clock rate, when measuring the velocity of an extended object having a spatial extent covering both radiation patterns.

9. The method of claim 3, wherein only signals are evaluated in step e which were reflected from an object in a given distance interval.

10. The method of claim 3, wherein the received third modulated signals and the received fourth modulated signals are sampled alternately at a predetermined clock rate, when measuring the velocity of an extended object having a spatial extent covering both radiation patterns.

11. The method of claim 8, wherein the received fourth modulated signals are sampled after a time difference t after the third modulated signals have been received, which time t corresponds to the time which a fixed point of the extended object needs to move from the first measuring point of distance $r_1$ and radial velocity $V_1$ to the second measuring point of distance $r_2$ and radial velocity $V_2$.

12. The method of claim 10, wherein the received fourth modulated signals are sampled after a time difference t after the third modulated signals have been received, which time t corresponds to the time which a fixed point of the extended object needs to move from the first measuring point of distance $r_1$ and radial velocity $V_1$ to the second measuring point of distance $r_2$ and radial velocity $V_2$.

* * * * *